United States Patent
Maroney

(10) Patent No.: US 10,097,636 B1
(45) Date of Patent: Oct. 9, 2018

(54) DATA STORAGE DEVICE DOCKING STATION

(71) Applicant: Western Digital Technologies, Inc., Irvine, CA (US)

(72) Inventor: John E. Maroney, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 397 days.

(21) Appl. No.: 14/740,206

(22) Filed: Jun. 15, 2015

(51) Int. Cl.
*G06F 15/16* (2006.01)
*H04L 29/08* (2006.01)
*H04L 12/06* (2006.01)

(52) U.S. Cl.
CPC .......... *H04L 67/1097* (2013.01); *H04L 12/06* (2013.01)

(58) Field of Classification Search
CPC .... H04W 48/08; H04W 16/10; H04L 5/0057; H04L 1/1614
See application file for complete search history.

(56) References Cited

U.S. PATENT DOCUMENTS

| | | | |
|---|---|---|---|
| 6,704,838 B2 | 3/2004 | Anderson | |
| 6,795,895 B2 | 9/2004 | Merkey et al. | |
| 7,035,972 B2 | 4/2006 | Guha et al. | |
| 7,127,633 B1 * | 10/2006 | Olson | G06F 11/2092 714/4.4 |
| 7,137,034 B2 | 11/2006 | Largman et al. | |
| 7,143,249 B2 | 11/2006 | Strange et al. | |
| 7,395,402 B2 | 7/2008 | Wilson et al. | |
| 7,401,197 B2 | 7/2008 | Kezuka et al. | |
| 7,424,637 B1 | 9/2008 | Schoenthal et al. | |
| 7,536,598 B2 | 5/2009 | Largman et al. | |
| 7,634,615 B2 | 12/2009 | Sutardja | |
| 7,681,007 B2 | 3/2010 | Rustagi et al. | |
| 7,701,705 B1 | 4/2010 | Szeremeta | |
| 7,814,273 B2 | 10/2010 | Barrall | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,266,376 B2 | 9/2012 | Maroney et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |

(Continued)

FOREIGN PATENT DOCUMENTS

WO    2012046929 A1    4/2012

OTHER PUBLICATIONS

Jun Xu, et al., U.S. Appl. No. 14/607,055, filed Jan. 27, 2015, 49 pages.

(Continued)

*Primary Examiner* — Tauqir Hussain
*Assistant Examiner* — Kamran Mohammadi
(74) *Attorney, Agent, or Firm* — Chang & Hale LLP

(57) ABSTRACT

Systems and methods are disclosed for communicating data between a plurality of data storage devices. Multiple standalone data storage devices may be coupled to a data storage device docking station. A master data storage device may control the communication the communication of data between the standalone data storage devices. Slave data storage devices may communicated data based on one or more commands transmitted by the master data storage device.

22 Claims, 9 Drawing Sheets

(56) References Cited

U.S. PATENT DOCUMENTS

| | | | |
|---|---|---|---|
| 8,547,658 B1 | 10/2013 | Szeremeta | |
| 2003/0149750 A1 | 8/2003 | Franzenburg | |
| 2005/0235076 A1* | 10/2005 | Winarski | G06F 8/65 |
| | | | 710/62 |
| 2006/0248252 A1* | 11/2006 | Kharwa | G06F 1/1632 |
| | | | 710/303 |
| 2007/0050538 A1 | 3/2007 | Northcutt et al. | |
| 2009/0228651 A1 | 9/2009 | Sharma et al. | |
| 2009/0259816 A1 | 10/2009 | Sharma et al. | |
| 2013/0061029 A1 | 3/2013 | Huff et al. | |
| 2013/0117502 A1 | 5/2013 | Son et al. | |
| 2013/0332927 A1* | 12/2013 | Tang | G06F 9/45545 |
| | | | 718/1 |
| 2014/0040702 A1 | 2/2014 | He et al. | |
| 2014/0223070 A1 | 8/2014 | Liu et al. | |
| 2015/0003004 A1 | 1/2015 | Wu | |

OTHER PUBLICATIONS

Thomas E. Ludwig, et al., U.S. Appl. No. 14/010,458, filed Aug. 26, 2013, 17 pages.

\* cited by examiner

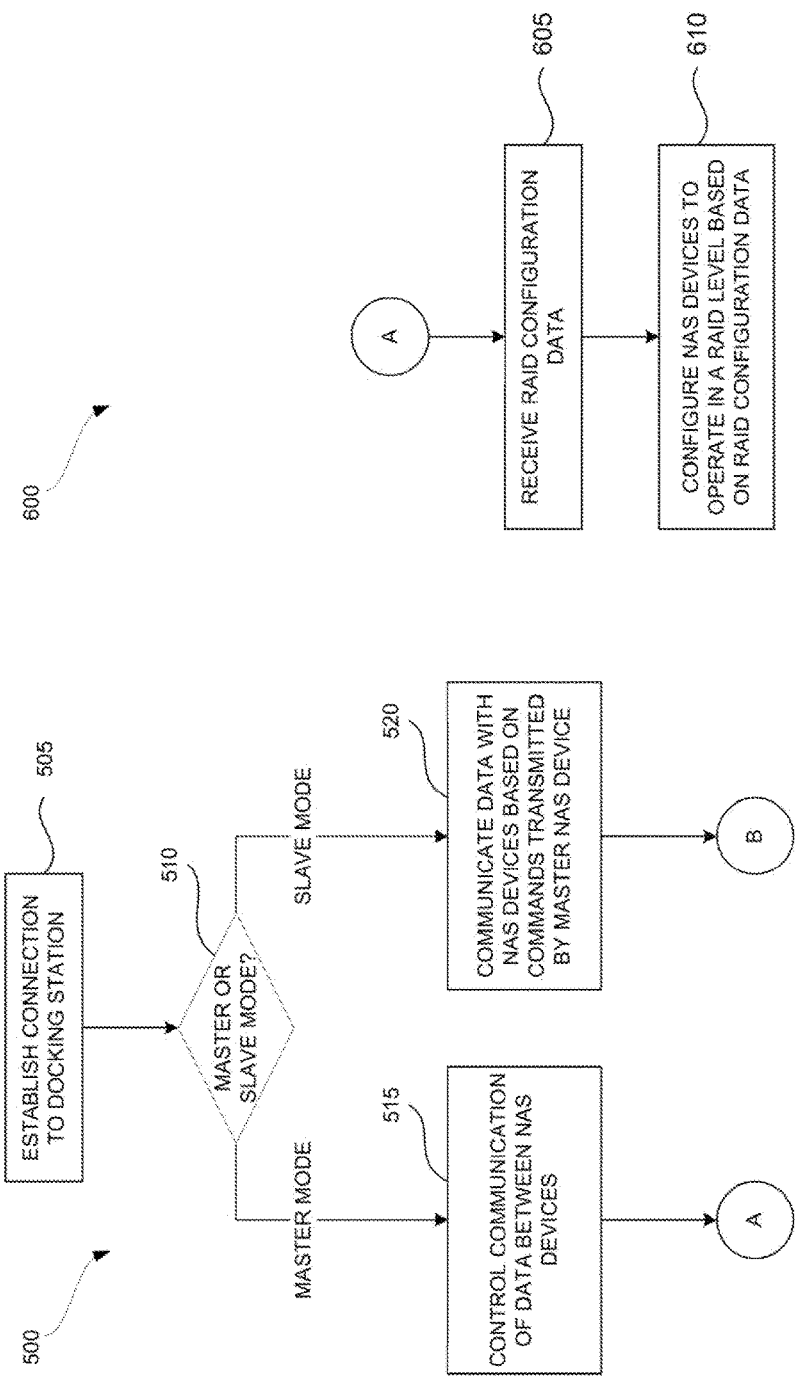

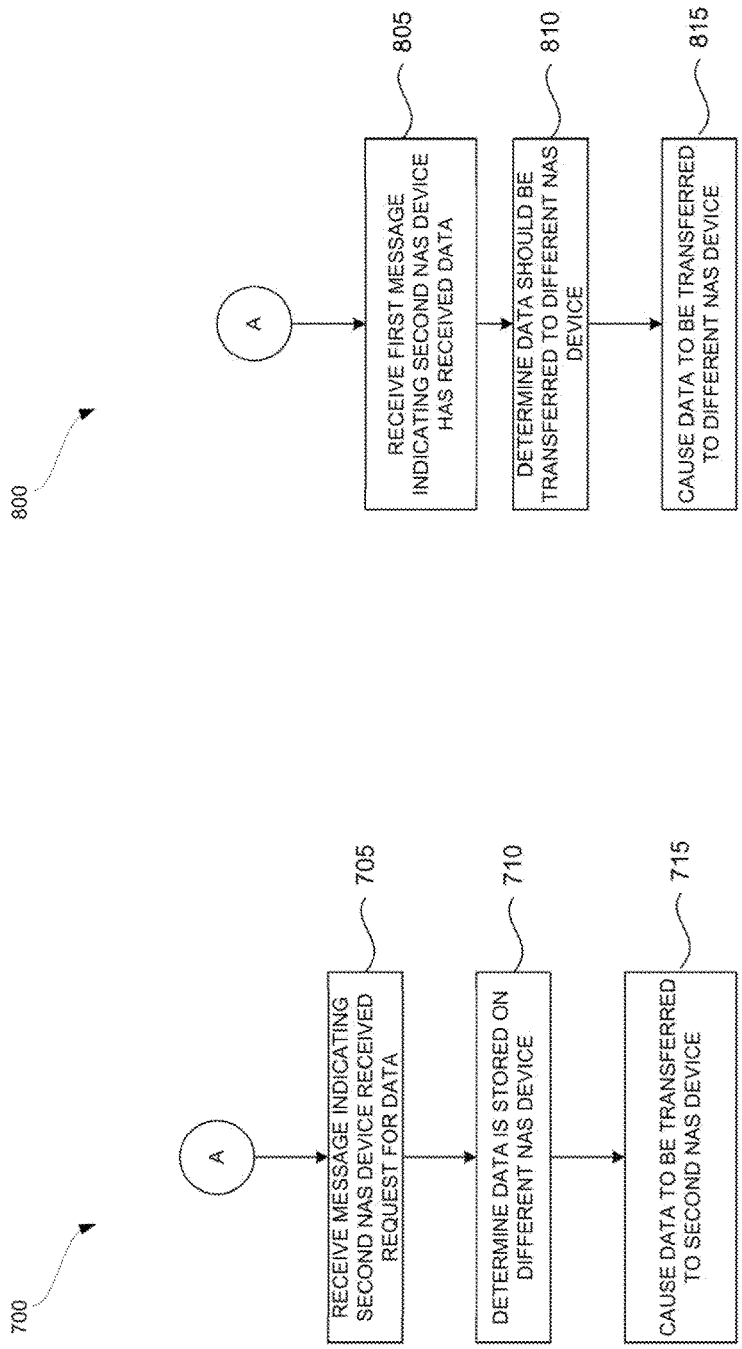

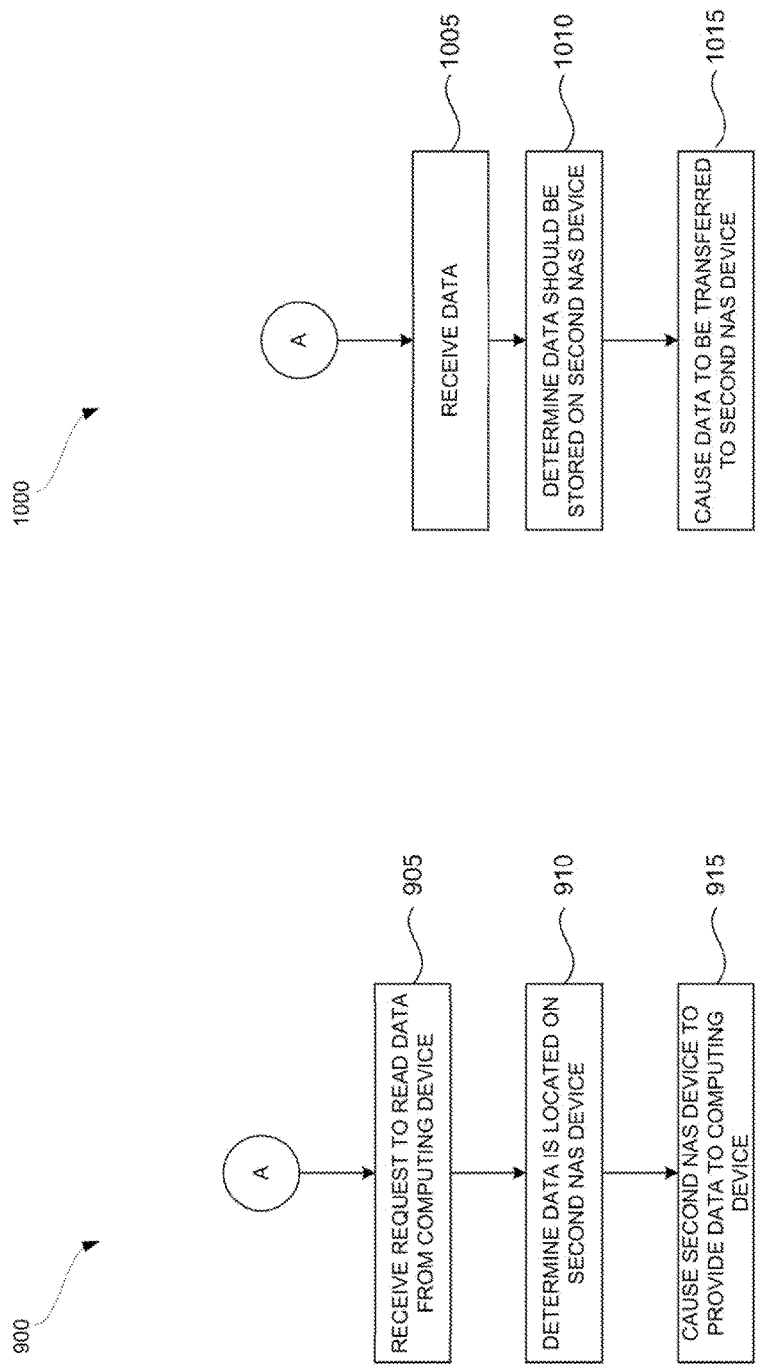

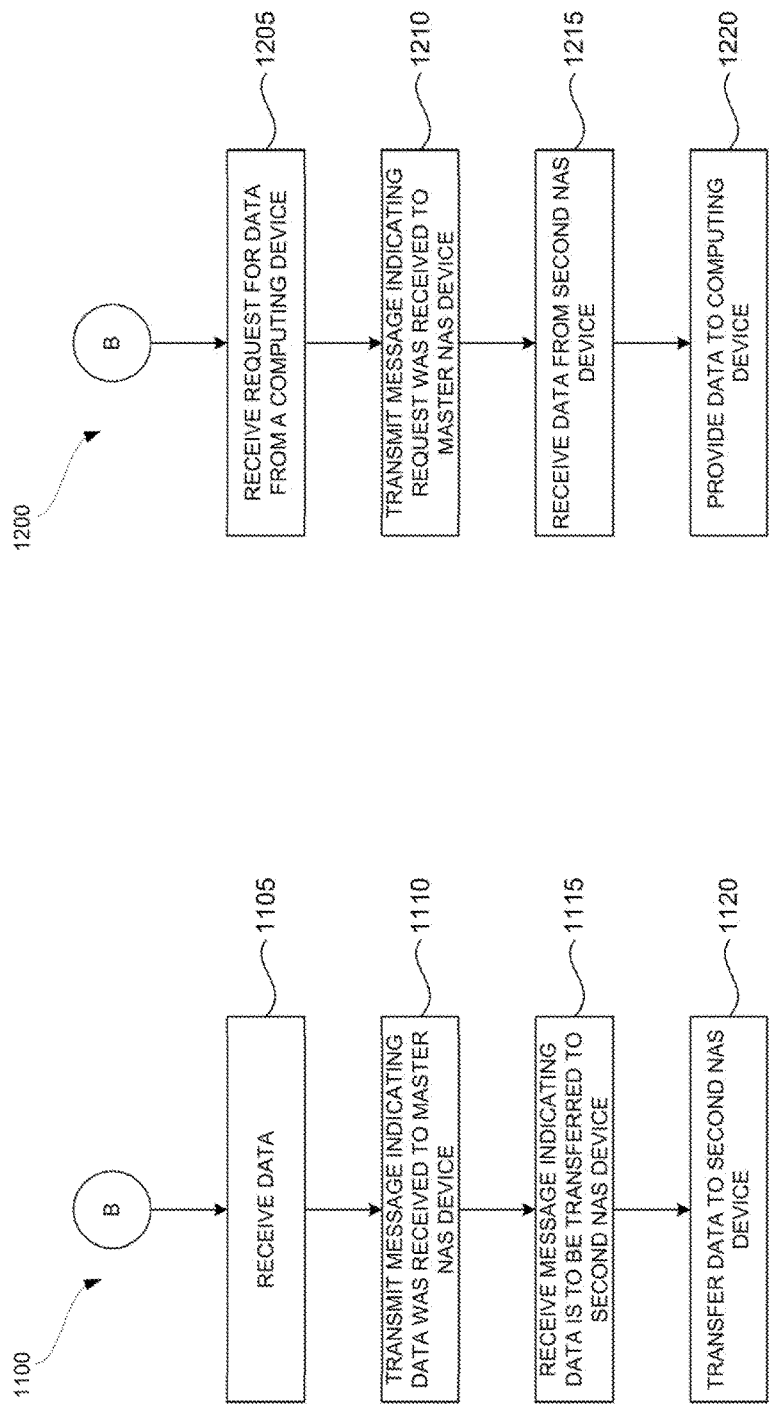

DATA STORAGE DEVICE DOCKING STATION

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 5 is a flow diagram illustrating a process for operating a data storage device, according to an embodiment.

FIG. 6 is a flow diagram illustrating a process for controlling and/or managing the communication of data between a plurality of data storage devices, according to an embodiment.

FIG. 7 is a flow diagram illustrating a process for controlling and/or managing the communication of data between a plurality of data storage devices, according to an embodiment.

FIG. 8 is a flow diagram illustrating a process for controlling and/or managing the communication of data between a plurality of data storage devices, according to an embodiment.

FIG. 9 is a flow diagram illustrating a process for controlling and/or managing the communication of data between a plurality of data storage devices, according to an embodiment.

FIG. 10 is a flow diagram illustrating a process for controlling and/or managing the communication of data between a plurality of data storage devices, according to an embodiment.

FIG. 11 is a flow diagram illustrating a process for communicating data between a plurality of data storage devices, according to an embodiment.

FIG. 12 is a flow diagram illustrating a process for communicating data between a plurality of data storage devices, according to an embodiment.

DETAILED DESCRIPTION

Figure 1:
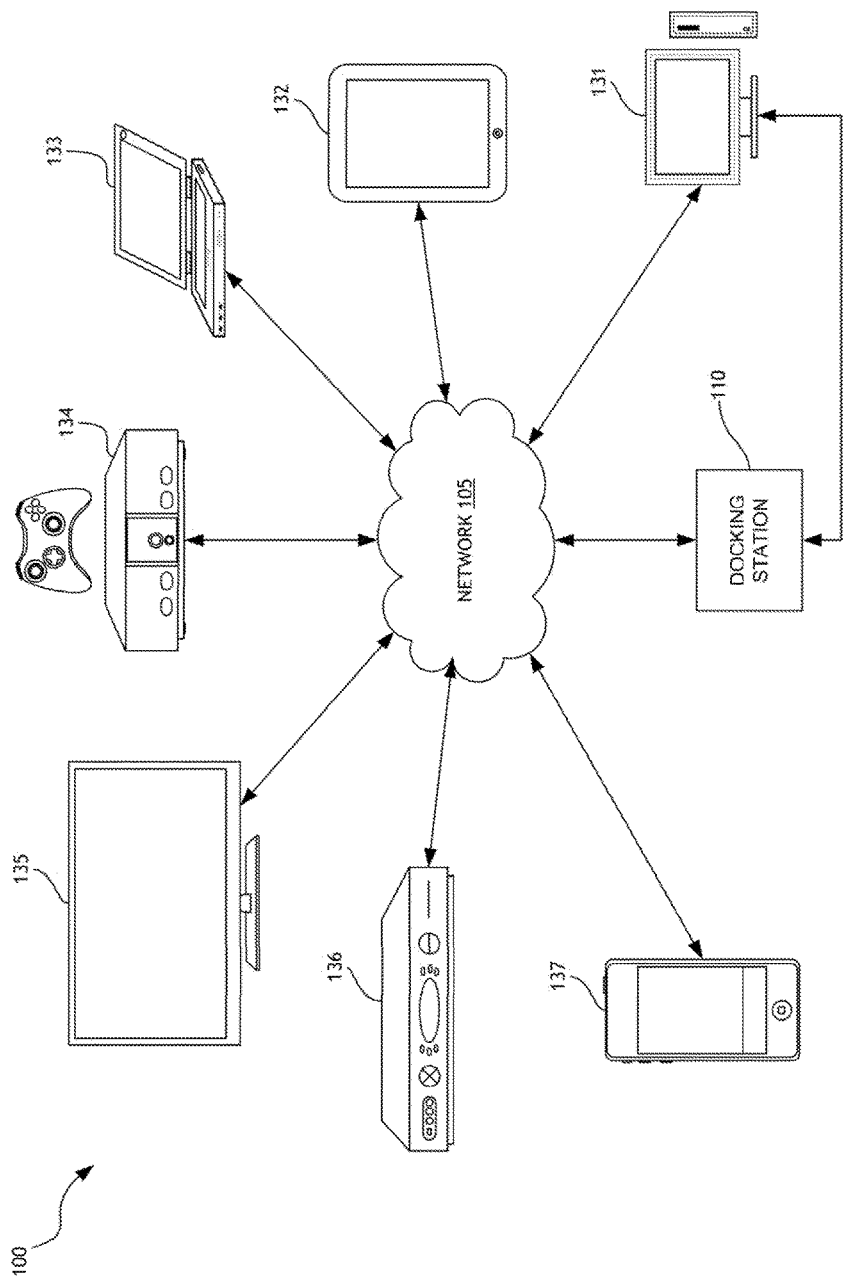
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to managing and/or controlling the communication of data between a plurality of data storage device that are coupled to a data storage device docking station.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB, Thunderbolt, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a NAS interface (e.g., a network interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability couple a plurality of standalone data storage devices (e.g., standalone NAS devices) to a data storage device docking station (e.g., a docking station). One of the plurality of standalone data storage devices may be a master data storage device. The master data storage device may control and/or manage access to data (e.g., control the reading and/or writing of data) that is stored in the plurality of data storage devices. The other standalone data storage devices may be slave data storage devices that allow access to the data based on commands transmitted by the master data storage device.

While certain embodiments are disclosed herein in the context of a particular DAS interface (e.g., USB, Thunderbolt, eSATA, etc.) and/or NAS interface (e.g., Wi-Fi, 802.11, Ethernet, etc.), the principles disclosed herein may be applicable to any suitable or desirable communication interface. In addition, while certain embodiments are disclosed herein in the context of NAS devices (e.g., standalone NAS devices), the principles disclosed herein may be applicable to any standalone data storage device (e.g., standalone DAS devices).

Data Storage Devices

FIG. 1 is a diagram of a data storage system 100, according to an embodiment. In the data storage system 100, a docking station 110 may be communicatively coupled to one or more client devices (e.g., computing devices) in order to provide file-based data storage services to the one or more client devices (e.g., one or more computing devices). Types of client devices (e.g., computing devices) that may have access to the docking station 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices. One or more data storage devices (e.g., DAS devices, NAS devices, etc.) may be coupled to the docking station 110 (as discussed in more detail below). In one embodiment, the one or more data storage devices may be standalone data storage devices. In one embodiment, a standalone data storage device may be a data storage device that is capable of operating without being directly coupled to a computing device. In another embodiment, a standalone data storage device may be a data storage device that includes a controller (e.g., a processor, a processing device) that is capable of receiving and/or processing data access requests (e.g., requests to read and/or write data). In a further embodiment, a standalone data storage device may be a data storage device that is capable of managing and/or controlling the communication of data between a plurality of data storage devices.

The docking station 110 device may provide various client devices (e.g., phones 137, cable set-top boxes 136, smart TV's 135, video game consoles 134, laptop computers 133, tablet computers 132, desktop computers 131) with access to various types of user data stored on the one or more data storage devices coupled to the docking station 110. The docking station 110 may also allow users to store various types of user data on the one or more data storage devices. The one or more data storage devices may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, each of the one or more data storage devices (e.g., magnetic disk drive, hybrid hard drive, solid-state drive, etc.) may include a controller (not shown in FIG. 1) configured to receive data commands and to execute such commands in one or more non-volatile memory components of the one or more data storage devices. Such commands may include data read/write commands, and the like. The controller may be configured to receive data commands from a communication interface residing on a computing device. Data commands may specify a block address in the one or more data storage devices and data may be accessed/transferred based on such commands. The data commands may also be referred to as data access requests.

Each data storage device that is coupled to the docking station 110 may be configured to store data in one or more magnetic recording disks and/or the solid state memory devices/arrays. In an embodiment, the docking station 110 may comprise a cable box, a backup disk drive, a media storage unit, a streaming media device, a digital camera, or any other electronic device which may store data that may need to be accessed directly or wirelessly, in the data storage devices that are coupled to the docking station 110.

In certain embodiments, the one or more data storage devices may store data received from a client device such that the one or more data storage devices act as data storage for the client device. To facilitate this function, the docking station 110 and/or the one or more data storage devices may implement a logical interface. The logical interface can present to the client device memory as a set of logical addresses (e.g., sequential/contiguous addresses) where data may be stored. Internally, the controller may map logical addresses to various physical memory addresses in the non-volatile memory of the one or more data storage devices. Mapping data indicating the mapping of logical addresses to physical memory addresses may be maintained in the docking station 110 and/or the one or more data storage devices.

In one embodiment, the one or more data storage devices may be DAS devices. The docking station 110 and/or the one or more data storage devices may be directly coupled to client device (e.g., a desktop computer 131) via connection cable 120. The connection cable 120 may be coupled to a communication interface (e.g., a USB interface, a Thunderbolt interface, etc.) of the DAS device (e.g., docking station 110). In another embodiment, the one or more data storage devices may also be NAS devices. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the docking station 110 and/or the one or more data storage devices may receive data access requests from the client devices 131-137 via the communication interface (e.g., a DAS interface such as USB, Thunderbolt) and/or via the network interface (e.g., a NAS interface such as Ethernet, 802.11, etc.). The data access requests may be messages, commands, and/or requests to access data on the data storage device. For example, a data access request may indicate that a computing device wants to read data from the one or more data storage devices. In another example, a data access request may indicate that a computing device wants to write data to the one or more data storage devices.

Although data storage devices/drives/systems may provide various benefits, as described above, in certain configurations, such systems may be associated with various issues and/or drawbacks. Standalone data storage devices (e.g., standalone NAS devices) may not be easily upgradable and/or expandable. For example, it may be difficult to add additional storage space (e.g., additional hard disks, additional solid state disks, etc.) to a standalone NAS device. In another example, it may be difficult to increase the processing capability (e.g., processing speed, processing power, etc.) of a standalone NAS device. In a further example, it may be difficult to increase the throughput (e.g., network throughput, network capacity, network bandwidth) of a standalone NAS device.

It may be useful to provide a data storage system that allows the storage space, throughput (e.g., network throughput), and/or processing capabilities of a standalone data storage device (e.g., a standalone NAS device) to be more easily upgradable and/or expandable.

Standalone Data Storage Device

Figure 2:
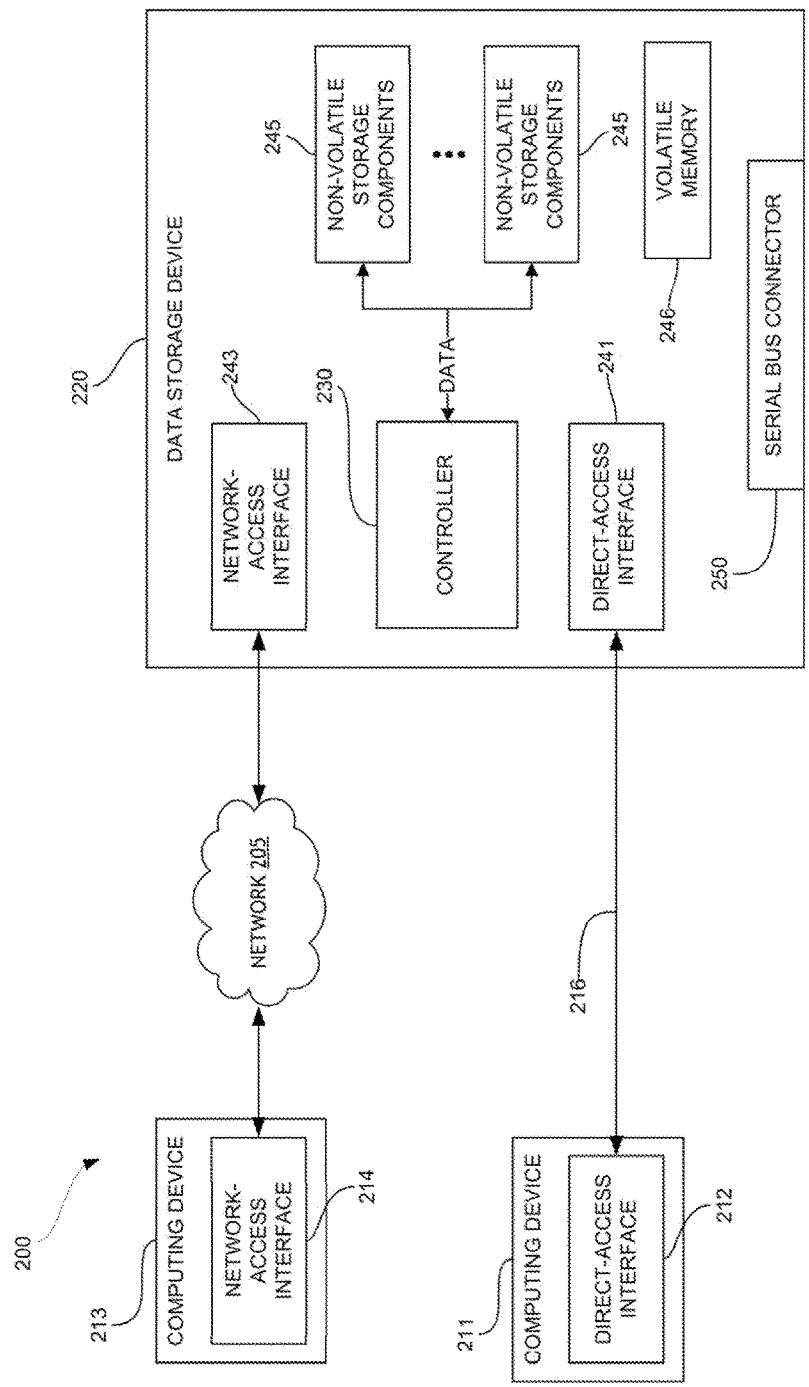
FIG. 2 is a diagram of a data storage system, according to an embodiment.

FIG. 2 is a diagram of a data storage system 200 according to an embodiment. The data storage system 200 includes a first computing device 211, a second computing device 213, a connection cable 216, and a data storage device 220. Each of the computing devices 211 and 213 may be a laptop computer, a desktop computer, a server computer, a tablet computer, a smart phone, a set-top box, a smart TV, a video game console, etc. The data storage device 220 may include a controller 230, a DAS interface 241 (e.g., USB, Thunderbolt, eSATA, etc.), a NAS interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media.

The data storage device 220 also includes a volatile memory 246. In one embodiment, the volatile memory 246 may operate as a cache for the data storage device. For example, the volatile memory 246 may store data that is to be written to the non-volatile storage components 245. In another example, the volatile memory 246 may store data that has been recently accessed (e.g., data that was recently requested by a computing device). In one embodiment, the volatile memory 246 may store data that is used to operate the data storage device 220 in a redundant array of independent disks (RAID) configuration/level. In one embodiment, the volatile memory 246 may be a random access memory (RAM) such as dynamic RAM (DRAM), static RAM (SRAM), etc.

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify an LBA, or range of LBAs, in the data storage device 220, and the controller 230 may execute the received data access requests in the non-volatile storage components 245. The controller 230 may also receive data access request from a NAS interface 214 (e.g., an Ethernet interface, a Wi-Fi interface, etc.) of the computing device 213. The controller may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s), such as volatile memory 246.

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via connection cable 216. The connection cable 216 may directly connect the computing device 211 and the data storage device 220. The connection cable 216 may use one or more communication interfaces (such as a bus interface) and/or protocols that may allow the computing device 211 to communicate with the data storage device 220. The DAS interface 212 and 214 may be USB interfaces, Thunderbolt interfaces, serial attached SCSI (SAS), eSATA interface, etc.

In one embodiment, the connection cable 216 may include one or more data lines (e.g., one or more wires, pins, etc.) that allow the computing device 211 to communicate data with the data storage device 220. For example, the connection cable 216 may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable 216 may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the communication interface 240. In a further embodiment, the data storage device 220 may be coupled to a separate power source (e.g., may be coupled to a battery, to an AC adaptor, to a wall outlet, etc.).

In one embodiment, the connection cable 216 may include a bridge unit (not shown in FIG. 2). For example, the connection cable 216 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., an Ethernet interface, a Wi-Fi interface, etc.) and the network 205. The data storage device 220 may receive the data and/or data access requests from the computing device 213 via the NAS interface 243.

The data storage device 220 also includes a serial bus connector 250. In one embodiment, the serial bus connector 250 may be a communication interface that allows the data storage device 220 to communicate (e.g., transmit and/or receive) data with another device (e.g., with a computing device, with a docking station, etc.). Examples of serial bus connectors include, but are not limited to, PCIe connectors, eSATA connectors, USB connectors, etc. The serial bus connector 250 may allow the data storage device 220 to be coupled to a docking station (e.g., docking station 110 as discussed in more detail below). The serial bus connector 250 may allow the data storage device 220 to receive data and/or commands from the docking station (as discussed in more detail below). The serial bus connector 250 may also allow the data storage device 220 to receive data and/or commands from other data storage devices that are coupled to the docking station (as discussed in more detail below).

In one embodiment, the data storage device 220 may operate as a master data storage device (as discussed in more detail below). In another embodiment, the data storage device 220 may operate as a slave data storage device (as discussed in more detail below).

Data Storage Device Docking Station

Figure 3A:
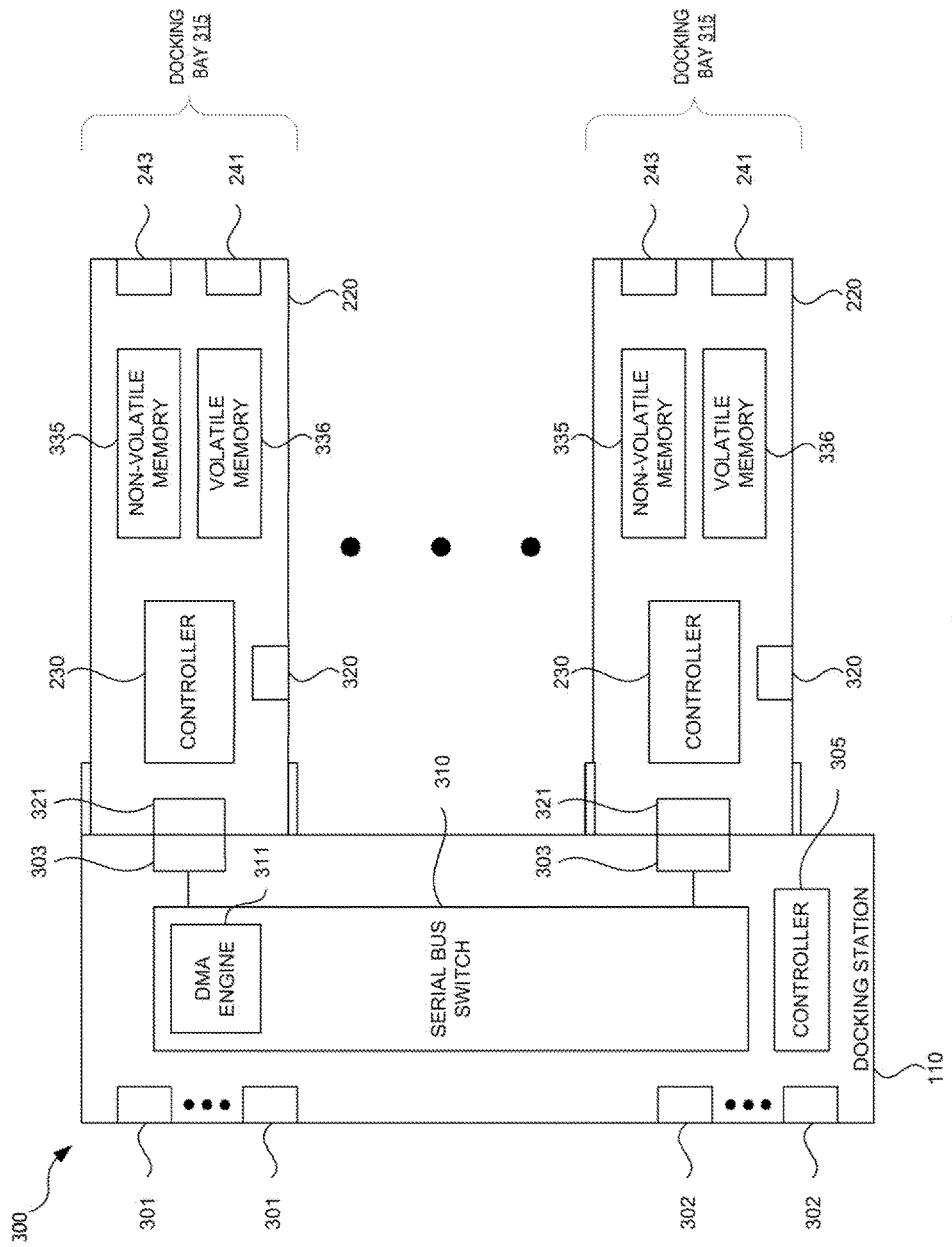
FIG. 3A is a diagram of a data storage system, according to an embodiment.

FIG. 3A is a diagram of a data storage system 300, according to an embodiment. The docking station 110 includes a plurality of docking bays 315 configured to receive a plurality of data storage devices 220. As discussed above, the plurality of data storage devices may be stand-alone data storage devices (e.g., standalone NAS devices, standalone DAS devices, etc.). In one embodiment, each docking bay 315 of the docking station 110 includes a serial bus connector 303. For example, the each docking bay 315 may include a PCIe connector, an eSATA connector, a USB connector, etc. Each serial bus connector 303 may be configured to couple with a serials bus connector 321 (e.g., a PCIe connector, an eSATA connector, a USB connector, etc.) of a standalone data storage device 220. The docking station 110 may communicate (e.g., transmit and/or receive) data access requests and/or data with the plurality of data storage devices 220 via the serial bus connectors 303 and 321.

The docking station 110 includes one or more DAS interfaces 301 and one or more power connectors 302. In one embodiment, the power connectors 302 may allow the docking station 110 to receive power (e.g., a voltage, a current, etc.) from one or more power sources (e.g., a wall outlet, a power adaptor, etc.). The docking station 110 may provide the power received from the power connectors 302 to the plurality of data storage devices 220. For example, the docking station 110 may provide the power to the plurality of data storage devices 220 via the serial bus connectors 303 and 321. The data storage devices 220 may use the power received from the docking station 110 to operate one or more components of the data storage devices 220 (e.g., wireless network interfaces, motors, magnetic heads, flash memory, controllers or processing devices, etc.).

In one embodiment, the DAS interfaces 301 may allow the docking station to be coupled via a connection cable (e.g., coupled directly via a USB cable) to one or more computing devices (e.g., laptop computers, server computers, tablet computers, etc.). The DAS interfaces 301 may allow the docking station 110 to receive data access requests, receive data, and/or transmit data to the one or more computing devices.

In one embodiment, the controller 305 may be configured to identify a master data storage device from the plurality of data storage devices 220. The master data storage device may control and/or manage transfers of data between the plurality of data storage devices 220 (as discussed in more detail below). The remaining data storage devices in the plurality of data storage devices may be referred to as slave data storage devices. The controller 305 may also be configured to determine if the master data storage device is inoperable (e.g., has failed, is no longer operating, etc.). For example, the controller 305 may periodically send status requests (e.g., data or messages) to the master data storage device and/or may periodically receive status reports (e.g., data or messages indicating a status) from the master data storage device. In another example, the controller may periodically determine whether the controller can communicate with one or more components of the master data storage device (e.g., the controller 230 of the master data storage device). If the master data storage device is inoperable, the controller 305 may select a new master data storage device. For example, the controller 305 may randomly select a new master data storage device, select new master data storage device based on configuration settings (e.g., configuration settings provided by a user), or based on other default parameters or settings (e.g., the data storage device 220 in the first drive bay is selected to be the master data storage device, followed by the second drive bay, the third drive bay, etc.).

In one embodiment, the controller 305 may be configured to manage and/or control the operations, actions, and/or functions of the docking station 110. For example, the controller 305 may control the operation of one or more light emitting diodes (LEDs) of the docking station 110. In another example, the controller may be configured to detect when data storage devices 220 are connected to and/or disconnected from the docking station 110 (e.g., inserted and/or removed from the docking bays 315). The controller 305 may also manage administrative communications and/or system level communications between the data storage devices 220. For example, the controller 305 may manage the communications of messages that may not be related to the communication/transfer of data between the plurality of data storage devices 220.

The docking station also includes a serial bus switch 310. In one embodiment, the serial bus switch 310 may include one or more communication lines (e.g., wires, traces, data lines, etc.) that interconnect the serial bus connectors 303. For example, the serial bus switch 310 may connect all of the serial bus connectors 303 to each other. The serial bus switch 310 may allow data storage devices 220 to communicate (e.g., transmit and/or receive) data between each other. The serial bus switch 310 includes a direct memory access (DMA) engine 311. The DMA engine 311 may also be referred to as a DMA controller. Although the DMA engine is illustrated as part of the serial bus switch 310 in FIG. 3A, in other embodiments, the DMA engine 311 may be separate from the serial bus switch 310. For example, the DMA engine 311 may be a separate component of the docking station 110 or may be included as part of the controller 305. DMA engine 311 may also be referred to as a DMA controller.

In one embodiment, the DMA engine 311 may be configured to perform DMA operations based on one or more commands received from the master data storage device. For example, the DMA engine 311 may write data directly to a non-volatile memory 335 (e.g., flash memory, a magnetic disk, etc.) and/or a volatile memory 336 (e.g., SRAM, DRAM, etc.) of the data storage device 220. In another example, the DMA engine 311 may directly obtain (e.g., access, read) data from a non-volatile memory 335 and/or a volatile memory 336 of the data storage device 220. The DMA engine 311 may read and/or write data to the non-volatile memories 335 and the volatile memories 336 of the data storage devices 220 based on one or more commands received from the master data storage device. For example, the DMA engine 311 may receive commands/instructions from the master data storage device to obtain (e.g., read) data from a first data storage device 220 and write the data to a second data storage device 220. The data may be obtained from a non-volatile memory 335 and/or a volatile memory 336 of the first data storage device 220 and may be written to a non-volatile memory 335 and/or a volatile memory 336 of the second data storage device 220. The one or more commands received from the master data storage device may be referred to as scatter/gather commands. In one embodiment, the scatter/gather commands may be data access requests/commands/instructions that cause the DMA engine 311 to read or obtain (e.g., gather) data from the plurality of data storage devices 220 (e.g., from the non-volatile memories 335 and/or the volatile memories 336). In another embodiment, the scatter/gather commands may be data access requests/commands that cause the DMA engine 311 to write (e.g., scatter) data to the plurality of data storage devices 220 (e.g., from the non-volatile memories 335 and/or the volatile memories 336).

As illustrated in FIG. 3A, each data storage device 220 includes a DAS interface 241, a NAS interface 243, a non-volatile memory 335, a volatile memory 336, a power connector 320, and a controller 230. As discussed above, each data storage device 220 may be a standalone data storage device (e.g., a standalone NAS device). For example, the data storage device 220 may operate as a standalone NAS device and may provide data storage and/or data access functionality for client devices via the NAS interface 243. The data storage device 220 may also receive power from a power source (e.g., a wall outlet, a power adaptor) via power connector 320.

In one embodiment, a controller 230 of a data storage device 220 may determine whether the data storage device 220 should operate in master mode or a slave mode. In one embodiment, the controller 230 may determine whether the data storage device 220 should operate as a master data storage device or a slave data storage device by determining whether a message, packet, or other data is received from the docking station 110 (e.g., from the controller 305). The message, packet, or other data may indicate that the data storage device should operate as a master data storage device or a slave data storage device. When operating in the master mode (e.g., when the data storage device 220 is a master data storage device), the data storage device 220 may control and/or manage the communication of data between the plurality of data storage devices 220 (as discussed in more detail below). The data storage device may also determine how data should be distributed between the plurality of data storage devices when operating in the master mode. When operating in the slave mode (e.g., when the data storage device 220 is a slave data storage device), the data storage device 220 may communicate data with other data storage devices 220 based on one or more commands transmitted by the master data storage device (as discussed in more detail below). In one embodiment, one data storage device 220 of the plurality of data storage devices 220 may operate in the master mode while the remaining data storage devices 220 may operate in the slave mode. In other embodiments, multiple data storage devices 220 may operate in the master mode.

Master Data Storage Device

In one embodiment, the master data storage device may receive redundant array of independent disks (RAID) configuration data. For example, a user may provide the RAID configuration (e.g., user input, configuration settings, etc.) indicating that the plurality of data storage devices should be configured in a RAID configuration/level (e.g., RAID 0, RAID 1, etc.). The controller 230 of the master data storage device may configure the plurality of data storage devices 220 (e.g., the master data storage device and the slave data storage device(s)) to operate in the RAID configuration/level based on the RAID configuration data.

As discussed above, the master data storage device may determine how data should be distributed across the plurality of data storage devices 220. In one embodiment, the master data storage device may distribute data across the plurality of data storage devices 220 based on various algorithms, settings, parameters, metrics, conditions, and/or rules. For example, when determining where data should be stored, the master data storage device may determine that data should be stored on the data storage device 220 that has the most free space. In another example, the master data storage device may determine that data should be distributed to multiple data storage devices 220 based on a RAID configuration/level. In a further example, the master data storage device may determine that certain types of data should be distributed to different data storage devices 220 (e.g., videos should be stored on a first data storage device, images should be stored on a second data storage device, word processing documents should be stored on third data storage device, etc.). The master data storage device may maintain a table (e.g., a file allocation table), a list, an index, and/or other information indicating where different data is stored (e.g., indicating how data and/or files are distributed across the data storage devices 220). In one embodiment, the master data storage device may update the table, list, index, other information, etc., when new data is stored in the data storage system 300 to indicate where the new data is stored (e.g., to identify one or more data storage devices 220 that include the new data). In another embodiment, the master data storage device may access the table, list, index, other information, etc., to determine where a filed and/or piece of data is stored.

In one embodiment, the master data storage device (e.g., a data storage device 220 that is operating in master mode) may receive data from a DAS interface 241, NAS interface 243, and/or DAS interface 301. The controller 230 of the master data storage device may determine whether the data should be communicated to one or more other data storage devices 220 (e.g., one or more slave data storage devices). If the data should not be communicated to one or more other data storage devices 220, the master data storage device may store the data within the non-volatile memory 335 and/or the volatile memory 336 of the master data storage device. If the data should be communicated to one or more other data storage devices 220, the controller 230 of the master data storage device may cause the data to be transferred to the one or more other data storage devices 220. For example, the master data storage device may transmit one or more commands (e.g., scatter/gather commands) to the DMA engine 311. The DMA engine 311 may copy, move, transfer, etc., the data from the master data storage device to the one or more other data storage devices 220.

In another embodiment, the master data storage device may receive a request to access data from a client device via the DAS interface 241, the NAS interface 243, and/or the DAS interface 301. The controller 230 of the master data storage device may determine whether the data is located on one or more other data storage devices 220 (e.g., one or more slave data storage devices). If the data is not located on one or more other data storage devices 220, the master data storage device provide the data to the client device. If the data is located on one or more other data storage devices 220, the controller 230 of the master data storage device may cause the one or more other data storage devices 220 to provide the data to the client device. The master data storage device may also cause the one or more other data storage devices 220 to provide the data to the master data storage device so that the master data storage device may provide the data to the client device. In a further embodiment, the master data storage device may receive a request to write data to the master data storage device and/or a request to read data stored on the master data storage device. The controller 230 of the master data storage device may provide the data to the client device and/or write the data to the master data storage device, based on the request.

In one embodiment, the master data storage device may receive a message from a first slave data storage device indicating that the first slave data storage device has received data from a client device (e.g., via a NAS interface and/or a DAS interface of the slave client device). The controller 230 of the master data storage device may determine whether data should be transferred to a different data storage device (e.g., to the master data storage device and/or a second slave data storage device). If the data should not be transferred to a different data storage device, the controller 230 may instruct the first slave data storage device to store the data (e.g., in a non-volatile memory or a volatile memory). If the data should be transferred to a different data storage device, the controller 230 of the master data storage device may cause the data to be transferred to a second slave data storage device. For example, the controller 230 may transmit one or more commands to the DMA engine 311 and the DMA engine 311 may read the data from the first slave data storage device and write the data to the different (e.g., second) data storage device.

In one embodiment, the master data storage device may receive a message from a first slave data storage device indicating that the first slave data storage device has received a request to access data (e.g., read data) from a client device (e.g., via a NAS interface and/or a DAS interface of the slave client device). The controller 230 of the master data storage device may determine whether data is located on a second slave data storage device. If the data is not located on the second slave data storage device, the controller 230 may instruct the first slave data storage device to provide the data to the client device. If the data is located on the second slave data storage device, the controller 230 of the master data storage device may cause the data to be transferred to the first slave data storage device. For example, the controller 230 may transmit one or more commands to the DMA engine 311 and the DMA engine 311 may read the data from the second slave data storage device and provide the data to the first slave data storage device. The first slave data storage device may provide the data to the client device. In another embodiment, the first slave data storage device may provide the data to the client device without transmitting the message to the master data storage device if the slave data storage device determines that the slave data storage device has the data.

Slave Data Storage Device

In one embodiment, a slave data storage device may receive a request to access (e.g., read) data from a client device via the DAS interface 241, the NAS interface 243, and/or the DAS interface 301. The controller 230 of the slave data storage device may determine whether the data is located on the slave data storage device. If the data is not located on the slave data storage devices 220, controller may transmit a message to the master data storage device indicating that a request to access the data was received. The master data storage device may cause the data to be transferred to the slave data storage device. For example, the master data storage device may transmit one or more commands to the DMA engine 311 to cause the DMA engine 311 to read the data from another data storage device (e.g., the master data storage device or another slave data storage device) and transfer/provide the data to the slave data storage device. In one embodiment, if the data is located on the slave data storage device, the controller 230 of the slave data storage device may provide the data to the client device. The controller 230 of the slave data storage device may also optionally transmit a message to the master data storage device indicating that the request to access the data was received by the slave data storage device and that the data has been provided to the client device.

In one embodiment, a slave data storage device may receive data from a client device via the DAS interface 241, the NAS interface 243, and/or the DAS interface 301. The controller 230 of the slave data storage device may transmit a message to the master data storage device indicating that data has been received from the client device. In one embodiment, the slave data storage device may receive a message and/or command indicating that the data should be stored in the slave data storage device. The controller 230 of the slave data storage device may store the data in slave data storage device based on the message and/or command (e.g., may store the data in a non-volatile memory 335 or a volatile memory 336). In another embodiment, the slave data storage device may transfer the data to another data storage device 220 (e.g., the master data storage device or another slave data storage device). For example, the master data storage device may determine that the data should be stored in another data storage device and the master data storage device may cause the DMA engine 311 to transfer the data from the slave data storage device to another data storage device 220.

Increasing Throughput and Processing Capability

Figure 3B:
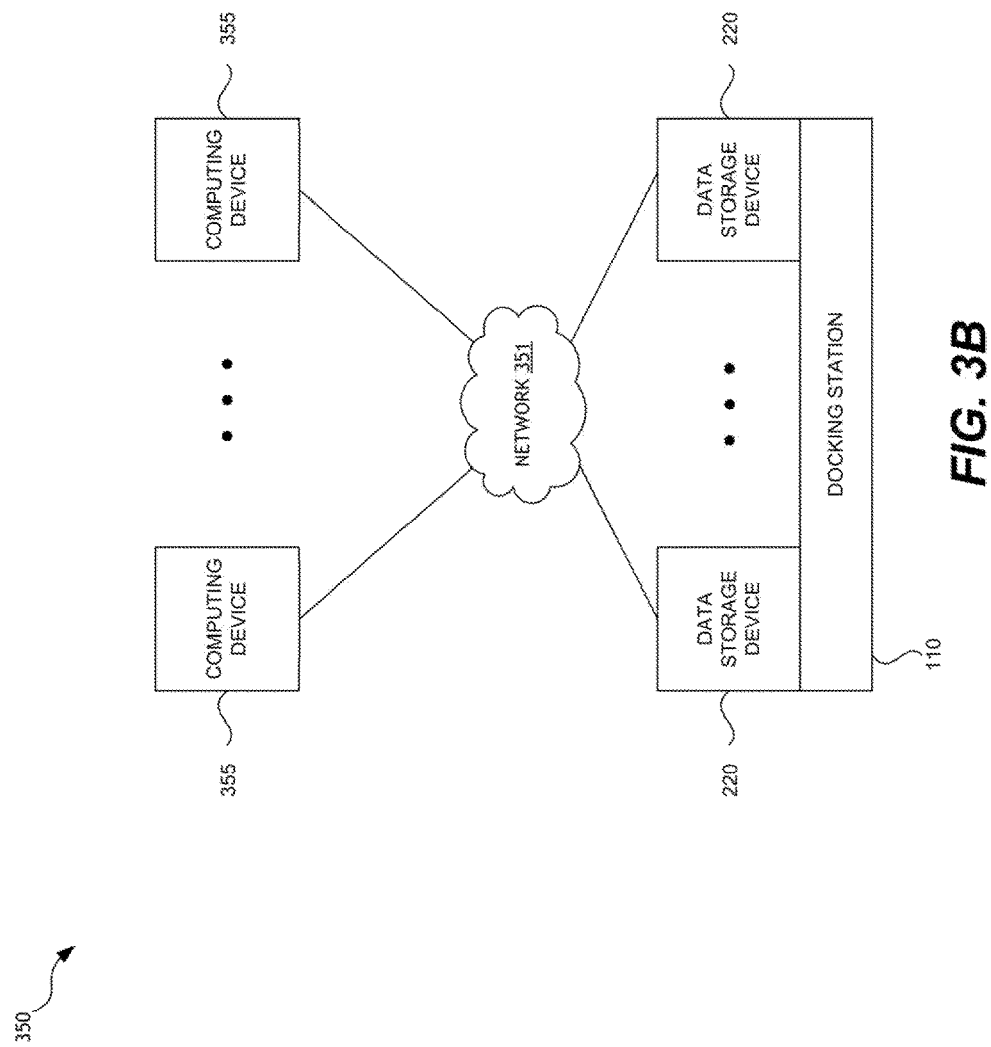
FIG. 3B is a diagram of a data storage system, according to an embodiment.

FIG. 3B is a diagram of a data storage system 350, according to an embodiment. As discussed above, the data storage system 350 includes a docking station 110 and a plurality of data storage devices 220 that are coupled to the docking station 110 (via serial bus connectors). A DMA engine of the docking station 110 may transfer data between the plurality of data storage devices 220 via a serial bus switch (as discussed above). A master data storage device may control the communication of data between the plurality of data storage devices 220 (as discussed above). One or more slave data storage devices may communicate data with other data storage devices 220 based on one or more commands transmitted by the master data storage device (as discussed above).

As illustrated in FIG. 3B, multiple data storage devices 220 may be coupled to a network 351 (e.g., one or more of a LAN, a Wi-Fi network, a cellular network, etc.). The data storage system 350 may be communicatively coupled to one or more computing devices 355 via the network 351. Because multiple data storage devices 220 may be coupled to the network 351 (via their respective NAS interfaces), the data storage system 350 may be able to provide increased processing capability (e.g., processing speed, processing power, etc.) when compared to a standalone data storage device (e.g., a standalone NAS device). The data storage system 350 may also be able to provide increased throughput (e.g., network throughput, network capacity, network bandwidth) when compare to a standalone data storage device. The data storage system 350 may also be able to provide increased storage capacity by receiving a new data storage device 220 (e.g., by coupling a new data storage device 220 to the docking station 110).

As discussed above, each data storage device 220 may include a NAS interface that allows the data storage device 220 to communicate with the network 351. This allows the data storage system 350 to use multiple communication channels (e.g., multiple logical communication channels and/or multiple physical communication channels) to communicate with the computing devices 355. This may allow the data storage system 350 to transfer data (e.g., send and/or receive data) between the data storage system 350 and the computing devices 355 more quickly. For example, a large file may be divided into multiple portions and each portion may be transmitted to the data storage system 350 using multiple communication channels (via the multiple NAS interfaces of the multiple data storage devices). This may reduce the amount of time for computing devices 355 to read data from and/or write data to the data storage system 350. This may also increase the amount of data that may transferred between the between the data storage system 350 and the computing devices 355 at a time. For example, instead of transferring one file at a time to the data storage system 350, a computing device 355 may transfer multiple files at a time to the data storage system 350 using multiple communication channels (e.g., transfer one file per communication channel).

Also as discussed above, each data storage device may include a controller (e.g., a processor, a processing device, etc.). This may allow the data storage system 350 to provide increased processing capability (when compared to a standalone data storage device. Each controller of each data storage device 220 may be used to process the data stored in the data storage devices 220 of the data storage system 350. For example, if multiple files are transferred to the data storage system 350, each controller of each data storage device 220 may perform operations to write one of the multiple files to a respective data storage device 220. In another example, if multiple files are to be transferred to a computing device 355 from the data storage system 350, each controller of each data storage device may perform operations to transmit one of the multiple files to the computing device 355 via a respective NAS interface. The data storage system 350 may use the multiple controllers of the multiple data storage devices 220 to increase the processing capability of the data storage system 350 when compared to a standalone data storage device (e.g., a single data storage device).

Operating Data Storage Devices in the Docking Station

Figure 4:
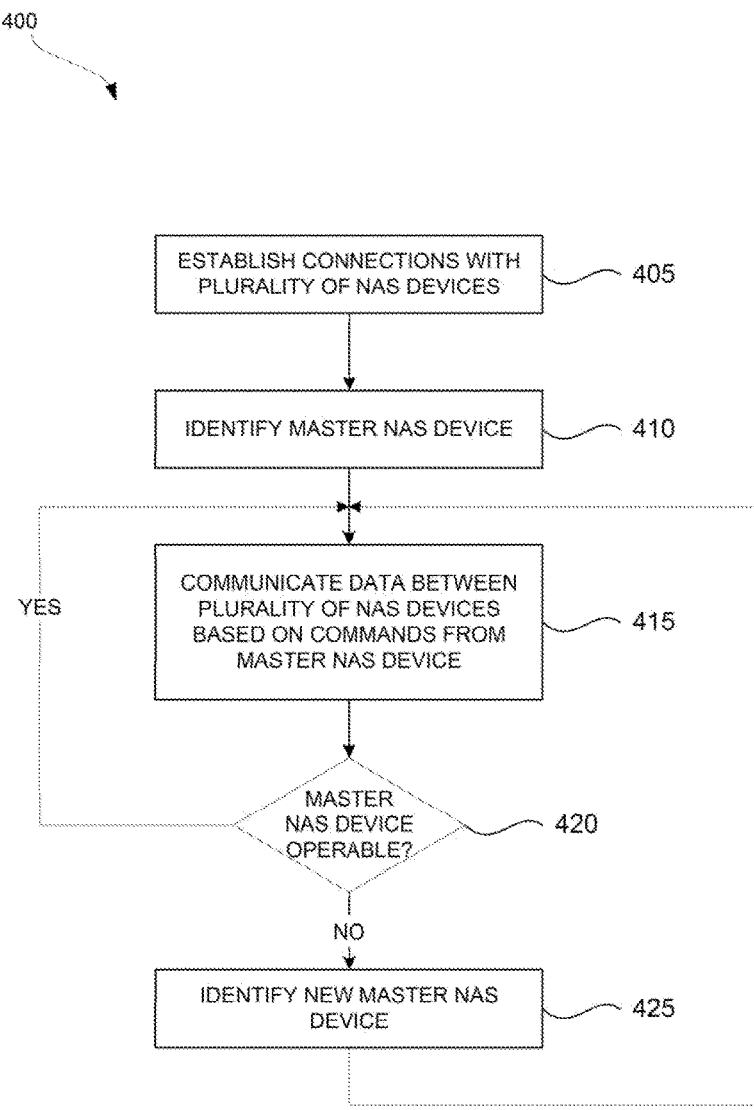
FIG. 4 is a flow diagram illustrating a process for operating a data storage device docking station, according to an embodiment.

FIG. 4 a flow diagram illustrating a process 400 for operating a data storage device docking station, according to an embodiment. The process 400 may be performed by a controller and/or a DMA engine (e.g., the controller of a data storage device docking station), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 establishes connections with a plurality of NAS devices (e.g., a plurality of standalone data storage devices, such as standalone NAS devices). For example, connections with NAS devices may be established when the NAS devices are inserted into docking bays of a data storage device docking station (as discussed above). At block 410, the process 400 identifies a master NAS device (e.g., a master data storage device) from the plurality of NAS devices. For example, the process 400 may randomly select one of the plurality of NAS devices as a master NAS device. In another example, the process 400 may select the master NAS device based on input, configurations, settings, and/or parameters provided by a user. In a further example, the process 400 may select the master NAS device based on default settings and/or parameters (e.g., the NAS device in the first drive bay is selected as the master NAS device).

At block 415, the process 400 may communicate data between the plurality of NAS devices based on commands (e.g., scatter/gather commands) received from the master NAS device. For example, process 400 may read data from a first NAS device and transfer the data to a second NAS device based on the commands received from the master NAS device (as discussed above). The process 400 may determine whether the master NAS device is operable at block 420. For example, the process 400 may transmit a status request message to the master NAS device (as discussed above). If the master NAS device is operable, the process 400 may continue to communicate data between the plurality of NAS device at block 415. If the master NAS device is not operable (e.g., the master NAS device has failed), the process 400 may select a new master NAS device at block 425 (as discussed above). After selecting the new master NAS device, the process 400 may continue to communicate data between the plurality of NAS devices based on commands received from the new master NAS device (at block 415).

FIG. 5 is a flow diagram illustrating a process 500 for operating a data storage device, according to an embodiment. The process 500 may be performed by a controller (e.g., the controller 230 illustrated in FIGS. 2 and 3A) of a NAS device (e.g., a standalone data storage device, a standalone NAS device), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. The process 500 begins at block 505 where the process 500 establishes a connection to the docking station (e.g., docking station 110 illustrated in FIGS. 1-3B). For example, the process 500 may establish a connection to the docking station via a serial bus connector of the NAS device. At block 510, the process 500 may determine whether to operate in a master mode or a slave mode (e.g., whether the data storage device should operate as a master NAS device or a slave NAS device). For example, the process 500 may receive a message from the docking station indicating whether the NAS device should operate in the master mode or the slave mode. If the NAS device should operate in the master mode, the process 500 proceeds to block 515 where the process 500 controls (e.g., manages) the communication of data between a plurality of NAS devices coupled to the docking station (as discussed above). If the NAS device should operate in the slave mode, the process 500 proceeds to block 515 where the process 500 communicates data with one or more other NAS devices coupled to the docking station based on commands transmitted by the master NAS device (as discussed above).

FIG. 6 a flow diagram illustrating a process 600 for controlling and/or managing the communication of data between a plurality of NAS devices (e.g., a plurality of standalone data storage devices, a plurality of standalone NAS devices), according to an embodiment. The process 600 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 600 may be performed by a controller of a master NAS device (e.g., a master data storage device).

The process 600 begins at block 605 where the process 600 receives RAID configuration data (as discussed above). For example, the process 600 may receive user input, settings, parameters, etc., indicating a RAID configuration/level. At block 610, the process 600 may configure the NAS devices coupled to a docking station to operate in the RAID configuration/level based on the user input, settings, parameters, etc., as discussed above. For example, the process 600 may configure the NAS devices to operate in RAID 0, RAID 1, etc., based on the user input, settings, parameters, etc.

FIG. 7 a flow diagram illustrating a process 700 for controlling and/or managing the communication of data between a plurality of data storage devices (e.g., a plurality of standalone data storage devices, a plurality of standalone NAS devices), according to an embodiment. The process 700 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 700 may be performed by a controller of a master NAS device (e.g., a master data storage device).

The process 700 begins at block 705 where the process 700 receives a message indicating that a second NAS device has received a request for data (e.g., received a request for data from a client device), as discussed above. The process 700 may determine that the data (requested by the client device) is stored in a different NAS device (e.g., is stored on a different slave NAS device) at block 710, as discussed above. For example, the process 700 may determine that the data is stored in a different NAS device based on a table, a list, an index, other information (as discussed above). At block 715, the process 700 may cause the data to be transferred to the second NAS device, as discussed above. For example, the process 700 may send one or more instructions to a DMA engine to transfer the data from the different NAS device to the second NAS device.

FIG. 8 a flow diagram illustrating a process 800 for controlling and/or managing the communication of data between a plurality of data storage devices (e.g., a plurality of standalone data storage devices, a plurality of standalone NAS devices), according to an embodiment. The process 800 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 800 may be performed by a controller of a master NAS device (e.g., a master data storage device).

The process 800 begins at block 805 where the process 800 receives a first message indicating that a second NAS device has received data (e.g., received data from a client device), as discussed above. The process 800 may determine that the data (received from the client device) should be transferred (e.g., stored) in a different NAS device (e.g., on a different slave NAS device) at block 810, as discussed above. The process 800 may also update a table, a list, an index, other information (as discussed above) to indicate that the data is stored on the different NAS device. At block 815, the process 800 may cause the data to be transferred to the different NAS device, as discussed above. For example, the process 800 may send one or more instructions to a DMA engine to transfer the data from the second NAS device to the different NAS device.

FIG. 9 a flow diagram illustrating a process 900 for controlling and/or managing the communication of data between a plurality of data storage devices (e.g., a plurality of standalone data storage devices, a plurality of standalone NAS devices), according to an embodiment. The process 900 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 900 may be performed by a controller of a master NAS device (e.g., a master data storage device).

The process 900 begins at block 905 where the process 900 receives a request to read data from a client device, as discussed above. For example, the process 900 may receive the request from the client device via a NAS interface and/or a DAS interface. The process 900 may determine that the data is located on a second NAS device at block 910, as discussed above. For example, the process 900 may determine that the data is stored in the second NAS device based on a table, a list, an index, other information (as discussed above). At block 915, the process 900 may cause the second NAS device to provide the data to the client device. For example, the process 900 may transmit a command to the second NAS device instructing the second NAS device to provide the data to the client device.

FIG. 10 a flow diagram illustrating a process 1000 for controlling and/or managing the communication of data between a plurality of data storage devices (e.g., a plurality of standalone data storage devices, a plurality of standalone NAS devices), according to an embodiment. The process 1000 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 1000 may be performed by a controller of a master NAS device (e.g., a master data storage device).

The process 1000 begins at block 1005 where the process 1000 receives data from a client device, as discussed above. The process 1000 may determine that the data should be stored on a second NAS device at block 1010, as discussed above. The process 1000 may also update a table, a list, an index, other information (as discussed above) to indicate that the data is stored on the second NAS device. At block 1015, the process 1000 may the data to be transferred to the second NAS device. For example, the process 1000 may send one or more instructions to a DMA engine to transfer the data to the second NAS device.

FIG. 11 a flow diagram illustrating a process 1100 for communicating data between a plurality of data storage devices, according to an embodiment. The process 1100 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 1100 may be performed by a controller of a slave NAS device (e.g., a slave data storage device).

The process 1100 begins at block 1105 where the process 1100 receives data from a client device, as discussed above. For example, the process 1100 may receive data from a client device via a DAS interface and/or a NAS interface. At block 1110, the process 1100 may transmit a message to a master NAS device indicating that data was received from the client device. At block 1115, the process 1100 may optionally receive a message indicating that the data is to be transferred to a second NAS device. At block 1120, the process 1100 may transfer the data to the second NAS device, as discussed above. For example, a DMA engine may read the data and may transfer the data to the second NAS device based on commands received from the master NAS device, as discussed above.

FIG. 12 is a flow diagram illustrating a process 1200 for communicating data between a plurality of data storage devices, according to an embodiment. The process 1200 may be performed by a controller (e.g., the controller 230 illustrated in FIGS. 2 and 3A), as illustrated and discussed above in conjunction with FIGS. 1-3B. The controller may be processing logic that includes hardware (e.g., circuitry, dedicated logic, programmable logic, microcode, etc.), software (e.g., instructions run on a processor to perform hardware simulation), firmware, or a combination thereof. In one embodiment, the process 1200 may be performed by a controller of a slave NAS device (e.g., a slave data storage device).

The process 1200 begins at block 1205 where the process 1200 receives a request for data from a client device, as discussed above. For example, the process 1200 may receive the request via a DAS interface and/or a NAS interface. At block 1210, the process 1200 may transmit a message to a master NAS device indicating that the request for data was received from the client device. At block 1215, the process 1200 may optionally receive the data from a second NAS device. For example, a DMA engine may transfer the data to from the second NAS device. At block 1220, the process 1200 may provide the data to the client device.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device docking station, comprising:
   a plurality of serial bus connectors configured to couple with a plurality of standalone network-access storage (NAS) devices;
   a controller, configured to couple to the plurality of standalone NAS devices, the controller further configured to:
   identify a master data storage device from the plurality of standalone NAS devices; and
   communicate data between the plurality of standalone NAS devices based on commands from the master data storage device;
   a serial bus switch coupled to the plurality of serial bus connectors, the serial bus switch configured to communicate data between the plurality of standalone NAS devices based on one or more commands transmitted by the master data storage device;
   a plurality of docking bays, wherein each docking bay of the plurality of docking bays is configured to receive a NAS device from the plurality of standalone NAS devices and wherein each docking bay of the plurality of docking bays comprises a serial bus connector from the plurality of serial bus connectors; and
   a direct memory access (DMA) controller configured to:
   receive data from a first NAS device of the plurality of standalone NAS devices; and
   write the data to a memory of a second NAS device of the plurality of standalone NAS devices based on the one or more commands received from the master data storage device.

2. The data storage device docking station of claim 1, wherein the memory of the second NAS device comprises at least one of volatile and non-volatile memory.

3. The data storage device docking station of claim 1, wherein the master data storage device is configured to control transfers of data between the plurality of standalone NAS devices.

4. The data storage device docking station of claim 1, wherein the controller is further configured to:
   determine that the master data storage device is inoperable; and
   identify a new master data storage device from the plurality of standalone NAS devices.

5. The data storage device docking station of claim 1, wherein the plurality of serial bus connectors comprises a set of peripheral component interconnect express (PCIe) connectors.

6. The data storage device docking station of claim 1, further comprising:
   one or more power connectors configured to:
   receive power from one or more power sources; and
   provide the power to the plurality of standalone NAS devices.

7. The data storage device docking station of claim 1, further comprising:
   a set of direct access interfaces coupled to the controller.

8. A standalone network attached storage (NAS) device, comprising:
   a network access interface;
   a serial bus connector configured to couple with a data storage device docking station, the data storage device docking station comprising:
   a plurality of docking bays for receiving a plurality of standalone NAS devices,
   wherein each docking bay comprises a receiving serial bus connector,
   wherein the data storage device docking station is configured to receive the standalone NAS device and one or more additional standalone NAS devices;
   a non-volatile memory; and
   a controller coupled to the non-volatile memory, the controller configured to:
   determine whether the standalone NAS device is to operate in a master mode or a slave mode;
   consequent to determining to operate in the master mode:
   control communication of data between the standalone NAS device and the one or more additional standalone NAS devices; and
   cause data to be written to a memory of a second NAS device of the plurality of standalone NAS devices; and
   consequent to determining to operate in the slave mode:
   communicate data with the one or more additional NAS devices; and
   write data to the non-volatile memory based on one or more commands transmitted by a master standalone NAS device.

9. The standalone NAS device of claim 8, wherein the controller is further configured to:
   consequent to determining to operate in the master mode:
   receive redundant array of independent disks (RAID) configuration data; and
   configure the standalone NAS device and the one or more additional standalone NAS devices to operate in a RAID level based on the RAID configuration data.

10. The standalone NAS device of claim 8, wherein the controller is configured to control the communication of data by:
- receiving, while operating in the master mode, a first message indicating that a second NAS device has received a first data;
- determining that the first data is to be transferred to a different NAS device; and
- causing the first data to be transferred to the different NAS device via a serial bus switch of the data storage device docking station.

11. The standalone NAS device of claim 8, wherein the controller is configured to control the communication of data by:
- receiving, while operating in the master mode, a request from a computing device to read a first data;
- determining that the first data is located in the second NAS device; and
- causing the second NAS device to provide the first data to the computing device.

12. The standalone NAS device of claim 8, wherein the controller is configured to control the communication of data by:
- receiving a first data while operating in the master mode;
- determining that the first data is to be stored in the second NAS device; and
- causing the first data to be transferred to the second NAS device.

13. The standalone NAS device of claim 8, wherein the controller is configured to control the communication of data by:
- receiving, while operating in the master mode, a first message indicating that the second NAS device has received a request for a first data;
- determining that the first data is stored in a different NAS device; and
- causing the first data to be transferred to the second NAS device.

14. The standalone NAS device of claim 8, wherein the controller is configured to communicate data by:
- receiving first data while operating in the slave mode;
- transmitting a first message, indicating that the first data has been received, to the master standalone NAS device;
- receiving a second message indicating that the first data is to be transferred to the second NAS device; and
- transferring the first data to the second NAS device via the serial bus connector.

15. The standalone NAS device of claim 8, wherein the controller is configured to communicate data by:
- receiving, while operating in the slave mode, a request for a first data from a computing device;
- transmitting a first message, indicating that the request has been received, to the master standalone NAS device;
- receiving the first data from the second NAS device via the serial bus connector; and
- providing the first data to the computing device.

16. The standalone NAS device of claim 8, wherein the controller is configured to determine whether to operate in the master mode or the slave mode by:
- receiving a first message indicating the master mode or the slave mode from the data storage device docking station.

17. The standalone NAS device of claim 8, wherein the serial bus connector comprises a peripheral component interconnect express (PCIe) connector.

18. A method, comprising:
- coupling a standalone network-access storage (NAS) device to a data storage device docking station, the data storage device docking station comprising:
  - a plurality of docking bays for receiving a plurality of standalone NAS devices,
  - wherein each docking bay comprises a serial bus connector,
  - wherein the data storage device docking station is configured to receive the standalone NAS device and one or more additional standalone NAS devices;
- determining whether the NAS device is to operate in a master mode or a slave mode;
- consequent to determining to operate in the master mode:
  - controlling communication of data between the NAS device and the one or more additional standalone NAS devices; and
  - causing data to be written to a memory of a second NAS device of the plurality of standalone NAS devices; and
- consequent to determining to operate in the slave mode:
  - communicating data with the one or more additional standalone NAS devices; and
  - writing data to a memory of the standalone NAS based on one or more commands transmitted by a master NAS device.

19. An apparatus, comprising:
- a plurality of serial bus connectors configured to couple with a plurality of standalone network-access storage (NAS) devices, the plurality of standalone NAS devices comprising:
  - a plurality of network interfaces configured to substantially simultaneously communicate data with one or more networks; and
  - a plurality of controllers configured to substantially simultaneously process the data;
- a plurality of docking bays for receiving the plurality of standalone NAS devices, each docking bay comprising a receiving serial bus connector from the plurality of serial bus connectors;
- a first controller, configured to couple to the plurality of standalone NAS devices, the first controller configured to:
  - identify a master NAS device from the plurality of standalone NAS devices; and
  - communicate data between the plurality of standalone NAS devices based on commands from the master NAS device;
- a serial bus switch coupled to the plurality of serial bus connectors, the serial bus switch configured to communicate data between the plurality of standalone NAS devices based on one or more commands transmitted by the master NAS device; and
- a direct memory access (DMA) controller configured to:
  - receive data from a first NAS device of the plurality of standalone NAS devices; and
  - write the data to a memory of a second NAS device of the plurality of standalone NAS devices based on the one or more commands received from the master NAS device.

20. The apparatus of claim 19, wherein the first controller is further configured to:
- determine that the master NAS device is inoperable; and
- identify a new master NAS device from the plurality of standalone NAS devices.

21. The method of claim 18, further comprising:
   determining that the master NAS device is inoperable; and
   identifying a new master NAS device from the plurality of standalone NAS devices.

22. The data storage device docking station of claim 1, wherein the controller is further configured to:
   receive redundant array of independent disks (RAID) configuration data from the master data storage device; and
   transmit the RAID configuration data to the one or more additional standalone NAS devices.

* * * * *